United States Patent
Potts et al.

(10) Patent No.: US 9,758,243 B1
(45) Date of Patent: Sep. 12, 2017

(54) CALCULATION OF HELICOPTER ROTOR BALANCE ADJUSTMENTS AND COEFFICIENTS USING MOBILE DEVICES OR CUSTOM COEFFICIENTS

(71) Applicants: Stephen Cary Potts, Huntsville, AL (US); Kenneth Wayne Speaks, Harvest, AL (US); Michael Peter Zekoff, Madison, AL (US)

(72) Inventors: Stephen Cary Potts, Huntsville, AL (US); Kenneth Wayne Speaks, Harvest, AL (US); Michael Peter Zekoff, Madison, AL (US)

(73) Assignee: RMCI, Inc., Huntsville, AL (US)

( * ) Notice: Subject to any disclaimer, the term of this patent is extended or adjusted under 35 U.S.C. 154(b) by 285 days.

(21) Appl. No.: 14/199,995

(22) Filed: Mar. 6, 2014

Related U.S. Application Data

(60) Provisional application No. 61/773,693, filed on Mar. 6, 2013.

(51) Int. Cl.
  *G06F 7/70* (2006.01)
  *B64C 27/57* (2006.01)
  *G01M 1/28* (2006.01)

(52) U.S. Cl.
  CPC .............. *B64C 27/57* (2013.01); *G01M 1/28* (2013.01)

(58) Field of Classification Search
  CPC combination set(s) only.
  See application file for complete search history.

(56) References Cited

U.S. PATENT DOCUMENTS

| | | | |
|---|---|---|---|
| 3,802,273 | A | 4/1974 | Helmuth |
| 3,945,256 | A | 3/1976 | Wilson et al. |
| 4,053,123 | A | 10/1977 | Chadwick |
| 4,112,774 | A | 9/1978 | Chadwick |
| 4,162,634 | A | 7/1979 | Hofmann |
| 4,238,960 | A | 12/1980 | Curtis |
| 4,485,678 | A | 12/1984 | Fanuele |
| 4,870,412 | A * | 9/1989 | Vuichard ............. G05D 1/0066 244/17.13 |
| 4,937,758 | A | 6/1990 | Hayden |
| 5,544,073 | A | 8/1996 | Piety |
| 5,870,699 | A | 2/1999 | Canada |
| 6,415,206 | B1 | 7/2002 | Ventres |
| 6,567,757 | B2 | 5/2003 | Bechhoefer |
| 6,574,572 | B2 | 6/2003 | Bechhoefer |
| 6,687,572 | B2 | 2/2004 | Stalsberg |
| 6,950,763 | B1 | 9/2005 | Bechhoefer |
| 7,272,513 | B2 | 9/2007 | Bechhoefer |
| 8,639,458 | B2 | 1/2014 | Bechhoefer |

(Continued)

OTHER PUBLICATIONS

Johnson, Lloyd. "History: Helicopter Rotor Smoothing." Undated publication by Dynamic Solutions Systems, Inc., Vista, California. Retrieved from http://www.dssmicro.com/theory/dsrothst.htm on Jun. 4, 2014.

(Continued)

*Primary Examiner* — Hussein A. Elchanti

(57) ABSTRACT

One embodiment of a method of calculating appropriate helicopter rotor adjustments, a method of calculating helicopter rotor adjustment coefficients, a method of producing a set of rotor adjustment coefficients for a specific rotor based on a limited data set, a software application for rotor balance, and a computing system for rotor balance.

18 Claims, 3 Drawing Sheets

(56) References Cited

U.S. PATENT DOCUMENTS

| | | | | |
|---|---|---|---|---|
| 2002/0095242 | A1* | 7/2002 | Bechhoefer | B64C 27/001 700/279 |
| 2006/0113425 | A1* | 6/2006 | Rader | B64C 15/00 244/17.11 |
| 2007/0164167 | A1* | 7/2007 | Bachelder | G05D 1/102 244/220 |
| 2010/0079729 | A1* | 4/2010 | Scanlon | G03B 21/00 353/13 |
| 2011/0054721 | A1* | 3/2011 | Goodrich | G05B 23/0283 701/14 |
| 2011/0159776 | A1* | 6/2011 | Mak | G05D 1/0858 446/232 |
| 2012/0015686 | A1* | 1/2012 | Krupnik | H04W 88/02 455/550.1 |
| 2012/0078544 | A1 | 3/2012 | Lynch | |
| 2013/0173224 | A1* | 7/2013 | Santerre | B64C 27/008 703/1 |

OTHER PUBLICATIONS

Bukowitz, D. & M. Nakhaeinejad. iRotorBalance (Version 1.2) [Mobile application software]. Published Dec. 9, 2012 by Motionics, LLC. Retrieved from https://itunes.apple.com/us/app/irotorbalance/id430978753 on Jun. 4, 2014.

Bukowitz, David O. iBalanceCalc (Version 1.4) [Mobile application software]. Published Mar. 30, 2011 by Salute Physique Aesthetica Technologie, LLC. Retrieved from https://itunes.apple.com/us/app/ibalancecalc/id366590361 on Jun. 4, 2014.

Grabill, Paul et al. "Rotor Smoothing and Vibration Monitoring Results for the US Army VMEP." Published Jun. 1, 2009 by Intelligent Automation Corp., Poway, California. Retrieved from www.dtic.mil/cgi-bin/GetTRDoc?AD=ADA501579 on Jun. 4, 2014.

International Vibration Technology, LLC. "Main Rotor Track and Balance Methods." Published Feb. 25, 2015 by International Vibration Technology, LLC, Pleasant Grove, Utah.

* cited by examiner

CALCULATION OF HELICOPTER ROTOR BALANCE ADJUSTMENTS AND COEFFICIENTS USING MOBILE DEVICES OR CUSTOM COEFFICIENTS

CROSS-REFERENCE TO RELATED APPLICATIONS

This application claims the benefit of provisional patent application Ser. No. 61/773,693, filed 2013 Mar. 6 by the present inventors, which is incorporated by reference.

PROGRAM

One embodiment is given in the ASCII attachment rotor_balance_source.txt, dated 2014 Mar. 6, with file size 292,311 bytes.

BACKGROUND

Prior Art

The following is a tabulation of some prior art that presently appears relevant:

U.S. patents

| U.S. Pat. No. | Kind Code | Issue Date | Patentee |
|---|---|---|---|
| 4,053,123 | A | 1977 Oct. 11 | Chadwick |
| 3,802,273 | A | 1974 Jul. 09 | Helmuth et al. |
| 3,945,256 | A | 1976 Mar. 23 | Chadwick et al. |
| 6,567,757 | B2 | 2003 May 20 | Bechhoefer et al. |
| 4,937,758 | A | 1990 Jun. 26 | DiMarco et al. |

Nonpatent Prior Art

Johnson, Lloyd. "History: Helicopter Rotor Smoothing." Retrieved from http://www.dssmicro.com/theory/dsroth-st.htm Motionics LLC. iRotorBalance (Version 1.2) [Mobile application software]. Retrieved from https://itunes.apple.com/us/app/irotorbalance/id430978753

Salute Physique Aesthetica Technologie, LLC. iBalanceCalc (Version 1.4) [Mobile application software]. Retrieved from https://itunes.apple.com/us/app/ibalancecalc/id366590361

Many types of rotating mechanical systems require balancing, including automobile wheels, ceiling fans, propellers, and helicopter rotors. If the center of mass of the rotating system is not located along the axis of rotation, rotation will involve acceleration toward the axis of rotation and result in a force on the support structure. This centripetal force is in a direction perpendicular to the axis of rotation and rotates at the rotational speed of the system. If the axis of rotation is not parallel to a principal axis, rotation will result in a torque on the support structure. This torque is about a vector that is perpendicular to the axis of rotation and rotates at the rotational speed of the system.

These rotating forces and torques generate vibrations and can have many negative consequences, including discomfort to persons in a structure attached to the rotating system, fatigue damage to the support structure, fatigue damage to the rotating system, and degradation of other components such as electronics exposed to the vibrations produced.

Rotating systems such as helicopter rotors that experience significant aerodynamic forces also produce vibrations due to the aerodynamic loads. As a helicopter flies with non-zero airspeed, a vibration at N times the rotating speed of the rotor is normal (where N is the number of blades on the rotor). This is due to each blade experiencing different conditions as it passes through the advancing and retreating areas of the rotor disc. Aerodynamic vibrations at the rotating speed of the rotor due to differences in the behavior of each blade are undesirable. Adjustments are made to the rotor system to minimize these differences in behavior and the resulting vibrations.

Due to the complexity and size of helicopter rotors and the high cost of operating a helicopter, balancing a helicopter rotor can be time-consuming and expensive. Due to differences between the mass distributions and aerodynamic properties of different helicopter blades, a helicopter rotor must be balanced whenever a blade is changed. As a result, the balancing of rotor systems is a significant maintenance cost driver for helicopters.

The magnitude and phase of the vibrations due to unbalance are measured using one or more accelerometers (or other vibration sensors) and a tachometer. These data are used to determine what adjustments to make by solving a linear system of equations. This system of equations includes a matrix of coefficients that describe the way the vibrations change in response to the various possible adjustments. These coefficients are generally assigned a fixed value for all helicopters of a particular model.

Balancing a helicopter's rotor system can be difficult and require many cycles of adjustments if the coefficients do not well describe the response of the vibrations due to rotor adjustments. This can be caused by coefficients that do not well describe the average response of rotors in the fleet or by individual rotors with responses that are significant outliers from the rest of the fleet. Individual outlier rotors can be caused by a variety of factors, including differences in the mass or stiffness of the mounting structure. These mounting differences affect the frequency response function between the rotor and the vibration sensor and can change the magnitude and phase of the vibrations at the rotational frequency of the rotor. No matter what the cause, following recommendations based on inaccurate coefficients can greatly increase the time, effort, and expense of balancing a rotor to an acceptable level of vibration.

It is common to use a laptop or desktop computer for gathering vibration data and generating coefficients and balance adjustments. Managing these systems and making them available to maintainers during lengthy rotor balance flight procedures is time-consuming. Furthermore, the laptops used for this purpose are often matched with a helicopter such that a particular laptop cannot be substituted with another. This is due to the lack of data synchronization between the machines, among other logistical problems.

Although some products used to balance rotating machinery (i.e., iRotorBalance and iBalanceCalc) are available for mobile devices, they are not domain-specific. To utilize these existing products, helicopter users would be required to transform vibration data before input, nullifying any time-saving effects. Furthermore, the existing mobile products do not support the use of different types of rotor adjustments such as tab bends or pitch link adjustments.

Existing custom coefficient approaches like the one used by DSS and described by Lloyd Johnson are inefficient because they require the use changes to only one adjustment type at a time and/or require many changes before a complete coefficient is calculated and an adjustment can be recommended.

SUMMARY

One embodiment of the invention consists of a method to calculate custom coefficients for individual rotors using a handheld mobile device such as a smartphone or a tablet. In this embodiment, these custom coefficients are calculated using any available data and are combined with standard fleet coefficients when the available data is insufficient to calculate all the required coefficients. In this embodiment the coefficients are then used to calculate appropriate adjustments to minimize the magnitude of vibrations induced by unbalance.

ADVANTAGES

The use of a convenient mobile device for calculating coefficients and adjustments at the location of a helicopter will reduce the time required for rotor balancing by eliminating trips between the helicopter and the location of a larger computing platform. The portability of the mobile device combined with the remote communication features and the shared treatment of aircraft data also allow updating of custom coefficients when the aircraft is not at its home maintenance location. This enables continuous improvement of the coefficients. A software embodiment as described also supports future technology development in rotor track and balance, allowing the software to be updated in place (maintaining all historical data for an aircraft) even if the standard for modeling the rotor system or performing adjustments is changed.

An embodiment of this invention allows configuration of the resulting balance recommendations into a format directly usable on the machine undergoing balance adjustment. For the balance of helicopters, this is the only practical way to reduce adjustment time since transforming generic balance recommendations to rotor adjustment types by hand is difficult or infeasible.

DRAWINGS

Figures

DETAILED DESCRIPTION

Figure 1:
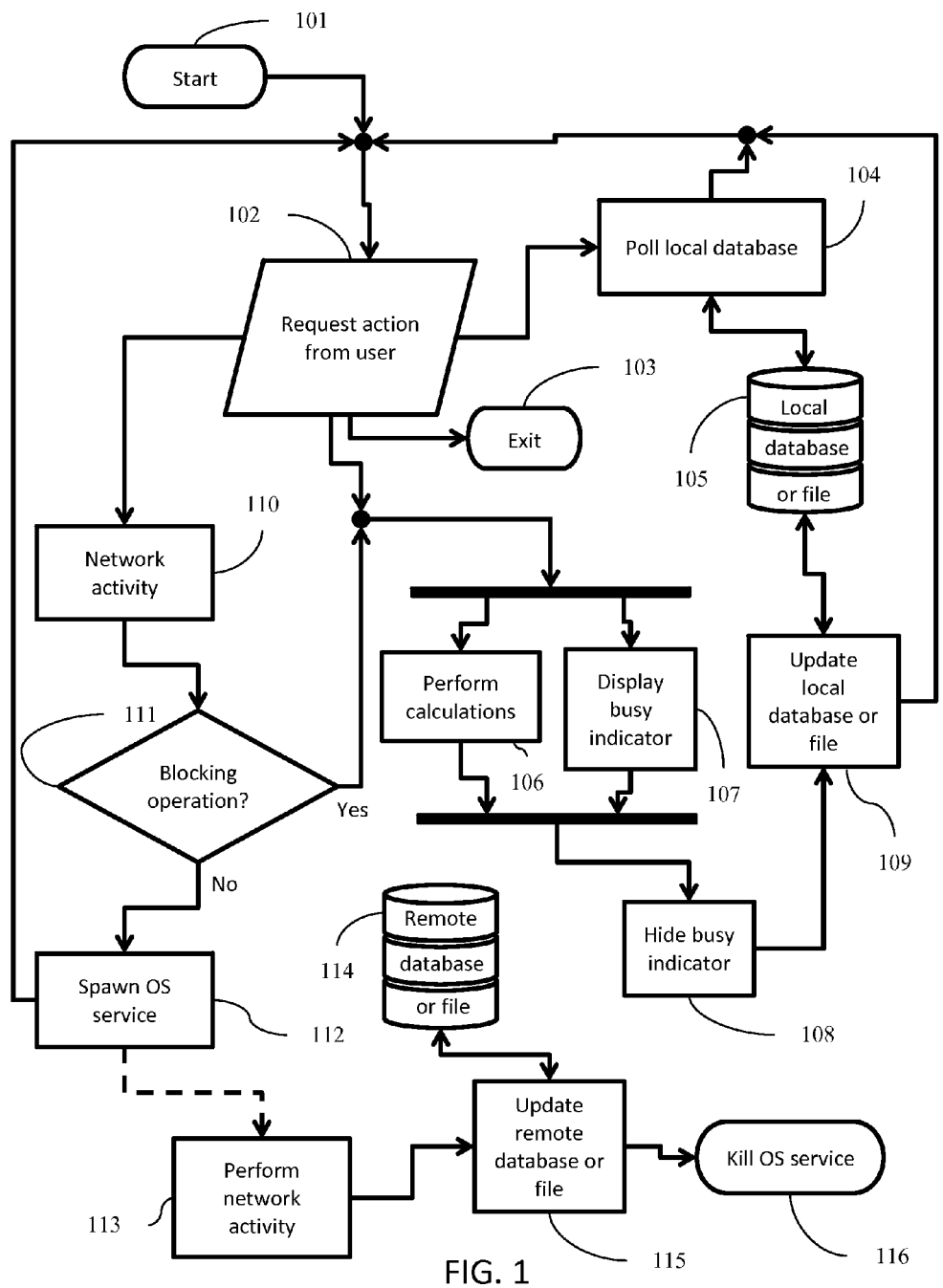
FIG. 1 shows the application states and transitions for one possible embodiment.
Figure 2:
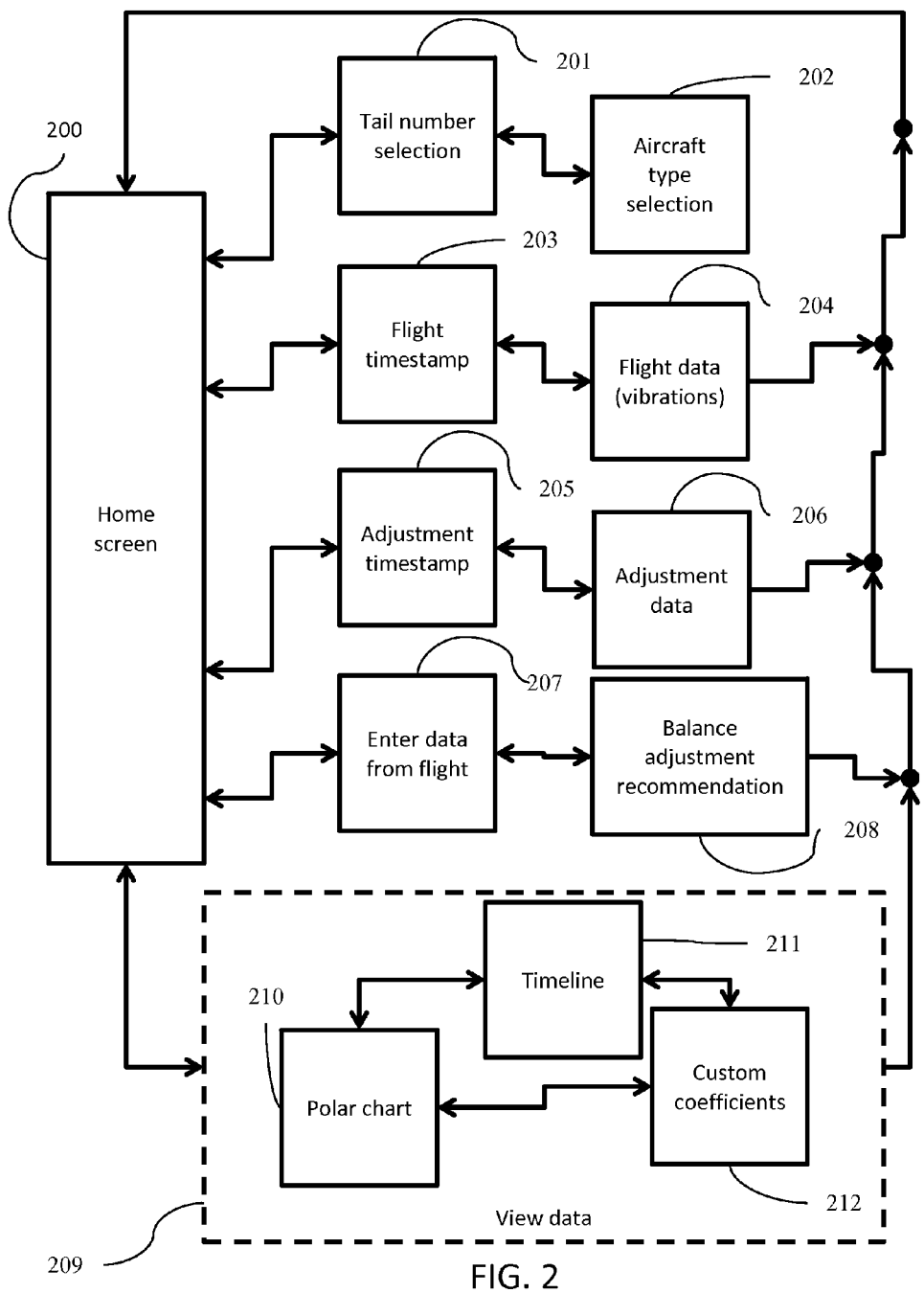
FIG. 2 shows the user interfaces and transitions for one possible embodiment.
Figure 3:
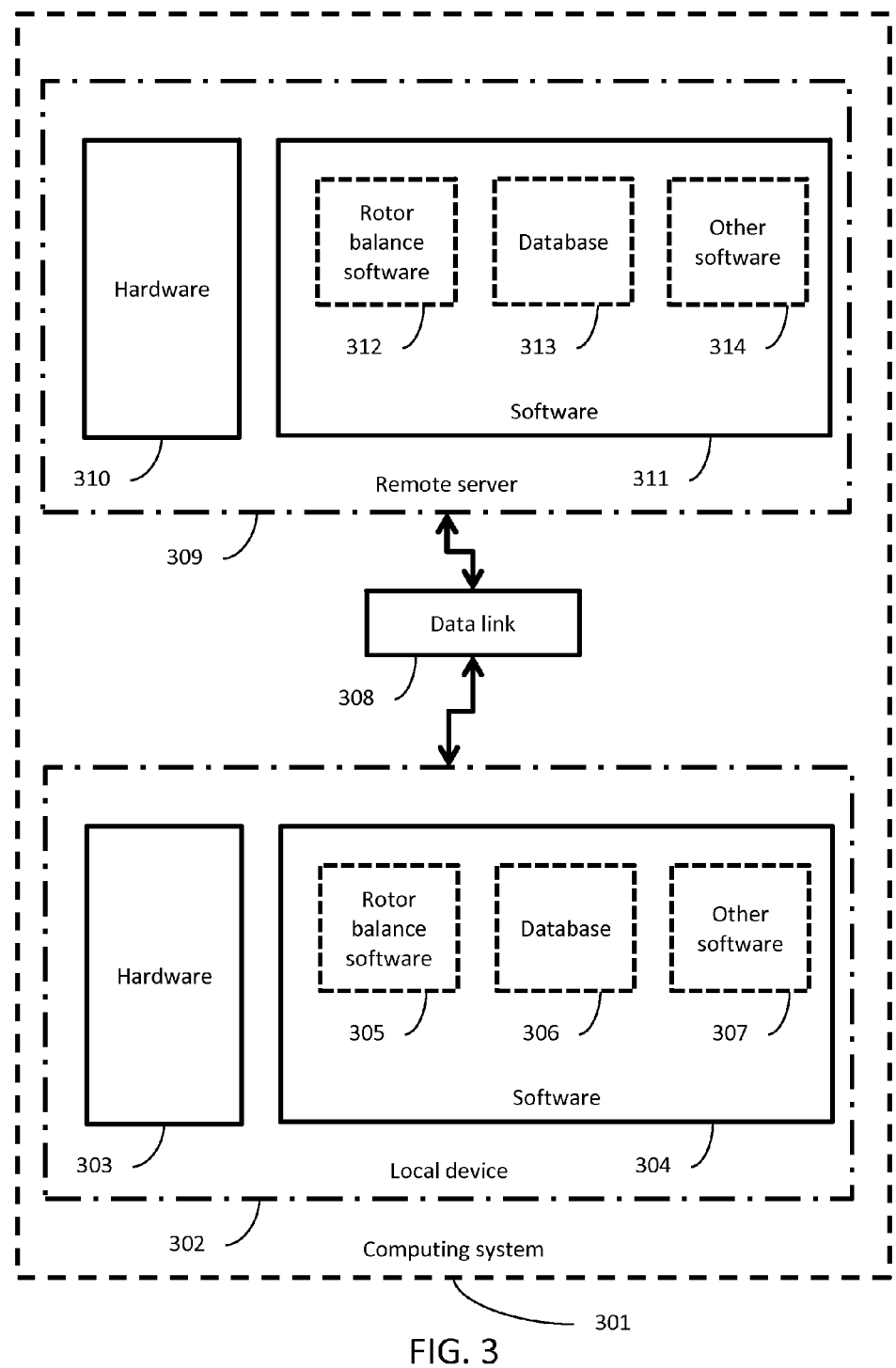
FIG. 3 shows the computing system architecture for one possible embodiment.

FIGS. 1, 2, and 3—First Embodiment

One embodiment of the invention can be implemented using software written for a handheld mobile device such as a smartphone or a tablet. One embodiment that currently seems preferable includes a user interface and a calculator. This embodiment also includes a configuration file reader and a database.

FIG. 1 describes the state machine for one possible software embodiment. In this implementation, the user starts the application from a list of applications installed on the device 101. The software presents a sequence of user interfaces that require input 102. Because one potential software embodiment is a program on a mobile device, the software may be exited at almost any time 103 to account for incoming phone calls, etc. The software then transitions from various states based on traversal of the user interface graph. Various states may be entered upon UI traversal. Many actions require the software to poll the local database 104 in order to read data required in rendering the screen to the user. The local database combines information that is shipped with the application including generic coefficients and machine description, information downloaded from configuration files and other server data after installation, data input based on flight history and maintenance events, and calculation results that are stored by the software 105. For lengthy operations, the software must spawn a second thread for calculation 106 to accommodate the mobile device environment while it displays a busy indicator on the primary user interface thread 107.

The calculator uses the stored history of vibration values and adjustments to calculate custom coefficients for each individual rotor. The calculator also uses those custom coefficients (and default fleet coefficients where custom coefficients are not available) to provide recommendations for the adjustments that will best minimize vibrations and to provide predictions regarding the vibrations that will exist after a particular adjustment.

The calculator computes the best estimate of each balance coefficients by dividing the sum of the stored vibration changes due to each stored adjustment by the sum of the stored adjustments for each combination of adjustment type and vibration measurement.

The calculator computes the recommended adjustment by solving the linear system of equations represented by $C*x=-b$ for x where C is a matrix containing the coefficients, b is a column vector of vibration values, and x is a column vector of adjustment values. Vector b is weighted by the relative weights in the configuration file. If the system of equations is over- or under-constrained, the calculator solves the system of equations in a least squares sense. After the calculator finds a solution, it rounds the adjustment values to the nearest discreet magnitude as specified in the configuration file. If for a particular application it is desirable to minimize the number of adjustments, the calculator can be configured so that it loops through every combination of adjustments, starting with each adjustment by itself and continuing to increase the number of adjustments until they are all included. In this process, the rows of x and columns of C that correspond to the unused adjustments are removed before the calculator solves the system of equations. The calculator can stop the loop once an acceptable solution has been found or it can find the best possible solution or it can find the best solution with no more than a particular number of adjustments.

The calculator determines predicted vibration values by computing $C*x+b$ where C is a matrix containing the coefficients, b is a column vector of current vibration values, and x is a column vector of adjustment values that are to be applied.

After calculation results are performed, the secondary thread is joined 108 and an update is performed to the local database 109. In cases where network activity is required 110, the software may take two paths based on whether the result of network activity is required to continue UI traversal 111. Blocking operations cause the multithreaded scenario to begin 106, while non-blocking operations cause the software to create a new operating system process 112; for example, an Android "Service" may be created. Another implementation might use a queued event model. The software returns control to the core UI loop 102 while the OS service performs its network activity 113. Upon completion, the remote database 114 and local database 105 are updated as necessary 115, and the OS service is killed 116. Another valid embodiment would be a multi-threaded (instead of multi-process) approach to network communication, similar to the technique for data calculation described.

FIG. 2 describes a possible sequence of user interface traversal. The first screen presented to the user 200, which is called the Home Screen, is the entry point for the application and the return point for completed actions. This screen exposes entry points for all other application features and configuration. It also allows the selection of different rotors on the same aircraft. From the Home Screen, the user may move back and forth from a list of tail numbers for which the application maintains custom coefficients and other data 201. Likewise, the user may move back and forth from the tail number selection screen to the aircraft type selection screen 202, which contains a list of aircraft configurations that the application supports, plus options for communicating with a remote server. From the Home Screen, the user may begin entering flight data 203-204 or adjustment data 205-206. Both of these usage paths begin with timestamp entry, followed by functionality specific to the type of data being entered. The flight data entry screen 204 is comprised of a table enumerating the various combinations of flight regime and sensor for which data is collected, with each cell containing a text entry field, plus buttons for validating the entered data and confirming its storage. The adjustment record entry screen 206 includes widgets for entering any type and amount of adjustment made to any adjustment point on the rotor system. This screen allows multiple types of adjustments to be recorded in a single adjustment event. The Home Screen also allows the user to generate a recommended adjustment based on flight data. On this usage path, the user enters the most recent flight data 207 (optionally populated from the most recent database entry), and then receives the recommended adjustment 208 based off of previously-developed coefficients and the vibrations entered on the previous screen, plus a polar chart for visualizing the projected effect of the proposed adjustments on the rotor system and a button for immediate persisting the adjustment to the local database as a maintenance event. Finally, the user may traverse from the Home Screen to the data history views 209, which present recorded data on a polar chart 210, as a timeline of flight and maintenance events 211, and as a table of both generated custom coefficients and fleet-standard coefficients 212. Users may move freely between the three views of historical data and may access data editing options through the timeline view.

FIG. 3 shows a system-level view of the architecture of one possible embodiment as a computing system 301. The computing system 301 includes a local device 302 that could be mobile device such as a mobile phone or tablet. The local device 302 may consist of hardware 303 and software 304, including software specifically related to rotor balancing 305, one or more databases 306, and other software 307. The software specifically related to rotor balancing includes the configuration file reader. The computing system may optionally include a data link 308 and a remote server 309. The server may consist of hardware 310 and software 311, including software specifically related to rotor balancing 312, one or more databases 313, and other software 314.

The configuration file reader reads configuration files that specify the characteristics of rotor systems. Each configuration file includes information about one or more particular types of rotor systems. Here a type of rotor system refers to those rotor systems that have the same physical properties and are expected to demonstrate similar balance responses. The configuration file specifies the types of adjustments available on the rotor system, the relative phase angles where those adjustments can be applied, and the discreet magnitudes allowed for each adjustment. The configuration file also specifies the vibration measurements that are collected, the system regimes in which those measurements are collected, the relative weight of each vibration measurement, and the default coefficients that describe the effect that each adjustment has on the vibration measurements for that type of rotor system.

The database stores information related to the other software components. It stores the information obtained from the configuration files, vibration values, applied adjustments, and coefficients. It is updated whenever a new value is obtained for any of the stored data elements. By storing a full history of vibration values and adjustments, those data can be used to calculate custom coefficients and can be used in solving problems with particular rotors.

Updates to the software and the coefficient file can be rapidly distributed through the Internet and downloaded to the handheld mobile device through standard communication channels. Use of a handheld mobile device allows the user to enter information and view recommendations from any location and provides compatibility with any existing balancing system that displays the required vibration information.

Operation

To operate this invention, the user, via an interface on a mobile device, collects vibration and adjustment information and then requests a recommendation on the type of adjustments to apply to the machine in order to bring it into balance. The user may consult or edit historical data as necessary, or collect additional information, to improve the recommendations.

Description and Operation of Alternative Embodiments

In an alternative embodiment, vibration information may be collected directly from a Data Acquisition Unit (DAU) on the aircraft or otherwise attached to the rotating machinery under observation. Embodiments may use direct wired connection via USB or other standard; direct wireless connection via 802.11 or other standard; indirect connection via remote server or other device; or alternative connection methods. This allows the user to skip the data-entry step for vibrations. Operation of the device in this embodiment could consist of only requesting balance adjustments from the software (assuming that both vibration information and maintenance event records are available from the DAU or other data store). However, this requires additional integration with the target system. The first described embodiment can be used without explicit integration.

Alternative embodiments can be used on other computing platforms such as desktop or laptop personal computers through the use of software similar to that described in the first embodiment.

CONCLUSION, RAMIFICATIONS, AND SCOPE

Thus the reader will see that at least one embodiment of the tool provides for faster balance of rotating machinery and thus reduces cost and increases operational availability.

Various embodiments are flexible to accommodate a variety of situations, thereby increasing commercial viability.

While the above description contains many specificities, these should not be construed as a limitation on the scope, but rather as an exemplification of several embodiments thereof. Many other variations are possible. For example, other low-power and otherwise resource-constrained devices can support embodiments of the invention, allowing a broader reach and the ability to meet the needs of users with wildly varying equipment.

Accordingly, the scope should be determined not by the embodiments illustrated, but by the appended claims and their legal equivalents.

We claim:

1. A method of calculating and applying helicopter rotor balance adjustments of a helicopter rotor, said method comprising:
    acquiring vibration information relating to a balance state of said helicopter rotor by a data acquisition unit on said helicopter coupled to at least one vibration sensor and at least one tachometer attached to said helicopter;
    transferring said vibration information to a mobile computing device;
    using said mobile computing device to perform calculations that transform said vibration information into said helicopter rotor balance adjustments based, at least on part, on custom coefficients and a predetermined configuration file stored in said mobile computing device;
    displaying said helicopter rotor balance adjustments on a display in said mobile computing device; and
    applying said helicopter rotor balance adjustments to said helicopter rotor to change said balance state of said helicopter rotor.

2. The method of claim 1, wherein said transferring of said vibration information comprises:
    receiving said vibration information by said mobile computing device from user input.

3. The method of claim 1, wherein said transferring of said vibration information comprises:
    receiving said vibration information by said mobile computing device from said data acquisition unit over a digital communication link.

4. The method of claim 1 further comprising:
    storing said helicopter rotor balance adjustments in said mobile computing device.

5. The method of claim 4, wherein said transferring of said vibration information comprises:
    receiving said vibration information by said mobile computing device from user input.

6. The method of claim 4, wherein said transferring of said vibration information comprises:
    receiving said vibration information by said mobile computing device from said data acquisition unit over a digital communication link.

7. A helicopter rotor balancing system for a helicopter rotor on a helicopter, said system comprising:
    a data acquisition unit configured for mounting on said helicopter;
    a vibration sensor connected to said data acquisition system and configured for mounting on said helicopter;
    a tachometer mounted on said helicopter and responsive to said rotor of said helicopter;
    said data acquisition unit configured for receiving vibration information from said vibration sensor and rotor information from said tachometer;
    said helicopter rotor balancing system further including a mobile computing device configured for receiving said vibration information from said data acquisition unit;
    said mobile computing device further configured for determining helicopter rotor balance adjustments based, at least on part, on custom coefficients and a predetermined configuration file stored in said mobile computing device;
    said mobile computing device further configured for displaying said helicopter rotor balance adjustments on a display in said mobile computing device; said rotor balance adjustments directed to improving a rotor balance state of said helicopter rotor.

8. The system as recited in claim 7, further including a remote server in communication with said mobile computing device, wherein said mobile computing device is configured to receive said predetermined configuration file from said remote server.

9. The system as recited in claim 7, further including a user input in said mobile computing device, wherein said mobile computing device is configured for receiving said vibration information from said vibration sensor via user input.

10. The system as recited in claim 7, further including a digital communication link between said data acquisition unit and said mobile comping device, wherein said mobile computing device is configured for receiving said vibration information from said data acquisition unit via said digital communication link.

11. A method of calculating and storing custom coefficients for helicopter rotor balance adjustment of a helicopter rotor, said method comprising:
    acquiring vibration information relating to a balance state of said helicopter rotor by a data acquisition unit on said helicopter coupled to at least one vibration sensor and at least one tachometer attached to said helicopter;
    transferring said vibration information to a mobile computing device;
    transferring information about rotor balance adjustments previously applied to said helicopter rotor to said mobile computing device;
    using said mobile computing device to perform calculations that transform said vibration information and said information about rotor balance adjustments previously applied into said custom coefficients based, at least on part, on a predetermined configuration file stored in said mobile computing device; and
    storing said custom coefficients in said mobile computing device.

12. The method of claim 11, wherein said transferring of said vibration information comprises:
    receiving said vibration information by said mobile computing device from user input.

13. The method of claim 11, wherein said transferring of said vibration information comprises:
    receiving said vibration information by said mobile computing device from said data acquisition unit over a digital communication link.

14. The method of claim 11 further comprising:
    displaying said custom coefficients on a display in said mobile computing device.

15. The method of claim 14, wherein said transferring of said vibration information comprises:
    receiving said vibration information by said mobile computing device from user input.

16. The method of claim 14, wherein said transferring of said vibration information comprises:

receiving said vibration information by said mobile computing device from said data acquisition unit over a digital communication link.

17. The system as recited in claim 7, wherein said mobile computing device further configured for receiving information about rotor balance adjustments previously applied to said helicopter rotor; and said mobile computing device further configured for performing calculations that transform said vibration information and said information about rotor balance adjustments previously applied into said custom coefficient.

18. The system as recited in claim 17, further including a remote server in communication with said mobile computing device, wherein said mobile computing device is configured to receive said predetermined configuration file from said remote server.

* * * * *